United States Patent
Rang et al.

(10) Patent No.: US 12,462,218 B2
(45) Date of Patent: Nov. 4, 2025

(54) FACILITY AND METHOD FOR EXECUTING LOGISTICS OPERATION

(71) Applicants: ALLY LOGISTIC PROPERTY CO., LTD., Taipei (TW); ALLY TRANSPORT SYSTEM CO., LTD., New Taipei (TW)

(72) Inventors: Ying-Xuan Rang, Taipei (TW); Heng-Po Wu, Taipei (TW); Hsuan-Po Lin, Taipei (TW)

(73) Assignees: ALLY LOGISTIC PROPERTY CO., LTD., Taipei (TW); ALLY TRANSPORT SYSTEM CO., LTD., New Taipei (TW)

( * ) Notice: Subject to any disclaimer, the term of this patent is extended or adjusted under 35 U.S.C. 154(b) by 350 days.

(21) Appl. No.: 17/988,314

(22) Filed: Nov. 16, 2022

(65) Prior Publication Data
US 2024/0161055 A1  May 16, 2024

(51) Int. Cl.
*G06Q 10/087* (2023.01)
*G05D 1/00* (2024.01)
*G06Q 10/047* (2023.01)

(52) U.S. Cl.
CPC ......... *G06Q 10/087* (2013.01); *G05D 1/0027* (2013.01); *G06Q 10/047* (2013.01)

(58) Field of Classification Search
CPC .. G06Q 10/087; G06Q 10/047; G05D 1/0027; G05D 1/6987; G05D 2105/28; G05D 2107/70; G05D 2109/10
USPC .......................................................... 705/28
See application file for complete search history.

(56) References Cited

U.S. PATENT DOCUMENTS

| | | | |
|---|---|---|---|
| 2015/0073589 A1* | 3/2015 | Khodl | G06Q 50/40 700/218 |
| 2018/0215485 A1* | 8/2018 | Koet | B65B 5/12 |

OTHER PUBLICATIONS

Thi, Thanh True Vo et al. A Control Algorithm for Automated Guided Vehicle in Logistics System. 6th International Conference on Green Technology and Sustainability Development (GTSD), 2022. (Year: 2022).*

* cited by examiner

*Primary Examiner* — Fawaad Haider
(74) *Attorney, Agent, or Firm* — MUNCY, GEISSLER, OLDS & LOWE, P.C.

(57) ABSTRACT

A facility for executing a logistics operation comprises a warehouse facility, comprising a level and a plurality of areas defined on the level. The areas comprise a sorting zone and a shipping zone in communication with the sorting zone. A plurality of container reload stations are fixedly arranged at a plurality of predetermined locations in the sorting zone. Each of the container reload stations comprise a sorting robot, and a plurality of first placing points and a second placing point located at a periphery of the sorting robot. A plurality of first robot autonomous guided vehicles are configured to respectively transfer inventory containers to the container reload station. A plurality of second robot autonomous guided vehicles are configured to respectively transfer order containers to be loaded. A server is communicatively connected to the sorting robot, the first robot autonomous guided vehicles, and the second robot autonomous guided vehicles.

13 Claims, 9 Drawing Sheets

FACILITY AND METHOD FOR EXECUTING LOGISTICS OPERATION

FIELD OF THE INVENTION

The present invention relates to a facility and method for executing a logistics operation, particularly to a facility and method for executing a logistics operation by dynamically adjusting a sorting mode.

BACKGROUND OF THE INVENTION

Transportation and storage of cargo is an important part in logistic operation, which affects the logistics efficiency and cost. Influenced by factors such as complication of network architecture, global market, supplier patterns, and consumer demands, logistics services providers, manufacturers, and importers and exporters face increasing challenges in logistics operation.

As far as order processing is concerned, operations of sorting and tallying cargo according to orders of customers often occupy a high proportion of working hours and cost. Even though most carrying flows at present have applied unmanned automatic devices, in a case where the automatic devices are unable to cooperate with each other effectively, only the hardware cost is increased, and the work efficiency and the efficiencies of the devices cannot be truly improved. Moreover, as a result of development of Internet of things and high specialization of the supply chains in industries, logistics operation also plays an important role in the supply chains of products or commodities. Cargo transportation and storage among the stations and in the stations in the supply chain also faces the above-mentioned problems.

Therefore, it is of great importance to make the hardware devices be efficiently cooperative based on the automatic carrying devices.

SUMMARY OF THE INVENTION

In order to solve the above-mentioned problems, the present invention provides a facility and method for executing a logistics operation, which may reduce the moving distances or times of the robot autonomous guided vehicles that carry cargo and idleness of the stations, and effectively increase the carrying and shipping efficiencies.

In order to achieve the above-mentioned objective, the present invention provides a facility for executing a logistics operation, including a warehouse facility, a plurality of container reload stations, a plurality of first robot autonomous guided vehicles, a plurality of second robot autonomous guided vehicles, and a server. The warehouse facility includes a level and a plurality of areas defined on the level, and the area includes a sorting zone and a shipping zone in communication with the sorting zone. The plurality of container reload stations are fixedly arranged at a plurality of set points in the sorting zone, and each of the plurality of container reload stations includes a sorting robot and a plurality of first placing points and a second placing point located at a periphery of the sorting robot. The plurality of first robot autonomous guided vehicles is configured to respectively transfer an inventory container to the container reload stations. The plurality of second robot autonomous guided vehicles is configured to respectively transfer an order container to be loaded. The server is communicatively connected to the sorting robot, the robot autonomous guided vehicle and the second autonomous guided vehicle. The facility is configured to execute the following steps: receiving an plurality of orders by the server, wherein the order respectively includes a plurality of order parameters; and calculating, by the server, an optimum balance between the shortest distances that the first robot autonomous guided vehicle and the second autonomous guided vehicle are required to move to fulfill the orders and the shortest number of times required to operate the sorting robot according to the order parameters of the plurality of orders, so as to select and perform one of a plurality of sorting modes.

In order to achieve the above-mentioned objective, the present invention provides a facility for executing a logistics operation including a warehouse facility, a plurality of container reload stations, a plurality of first robot autonomous guided vehicles, a plurality of second robot autonomous guided vehicles, and a server. The warehouse facility includes a level and a plurality of areas defined on the level, and the area includes a sorting zone and a shipping zone in communication with the sorting zone. The plurality of container reload stations are fixedly arranged at a plurality of set points in the sorting zone, the container reload station including a sorting robot and a plurality of first placing points and at least one second placing point located at a periphery of the sorting robot. The plurality of first robot autonomous guided vehicles is configured to respectively transfer an inventory container to the container reload stations. The plurality of second robot autonomous guided vehicles is configured to respectively transfer an order container to be loaded. The server is communicatively connected to the sorting robot, the first robot autonomous guided vehicles and the second robot autonomous guided vehicles, wherein the facility is configured to select and perform one of a plurality of sorting modes.

In order to achieve the above-mentioned objective, the present invention further provides a method for executing a logistics operation, including the following steps: transporting one or a plurality of containers from a commodity supply source in a supply chain to the aforementioned facility; performing a sorting operation on the containers by the facility; and transporting the containers subjected to the sorting operation to a downstream point of the supply chain.

DETAILED DESCRIPTION OF THE PREFERRED EMBODIMENTS

Terms used herein are merely based on illustration of specific embodiments and are not intended to limit the present invention. As used herein, the singular forms "a", "an", and "the" include the plural forms as well, unless the context clearly indicates otherwise.

The flowchart used herein describes the steps executed according to the embodiments. It is to be understood that the steps do not necessarily have to be executed precisely according to the sequence described herein. On the contrary, the steps may be executed according to an inverted order or may be executed simultaneously. Meanwhile, other steps may further be added into the processes, or a certain step or a plurality of steps of operations may be removed from the processes.

Figure 1:
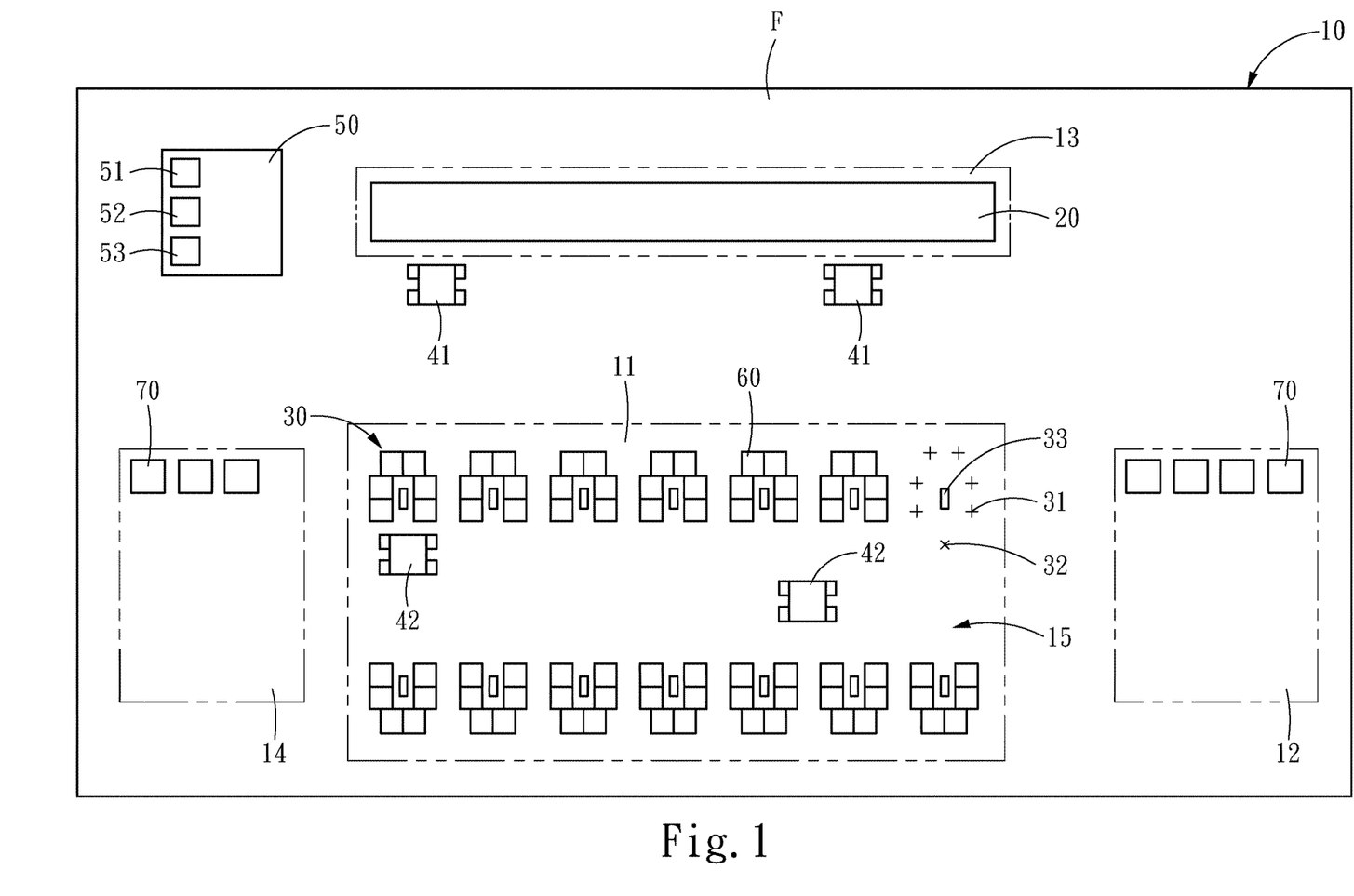
FIG. 1 is a schematic diagram for configuration of a facility for executing a logistics operation according to the present invention.
Figure 2:
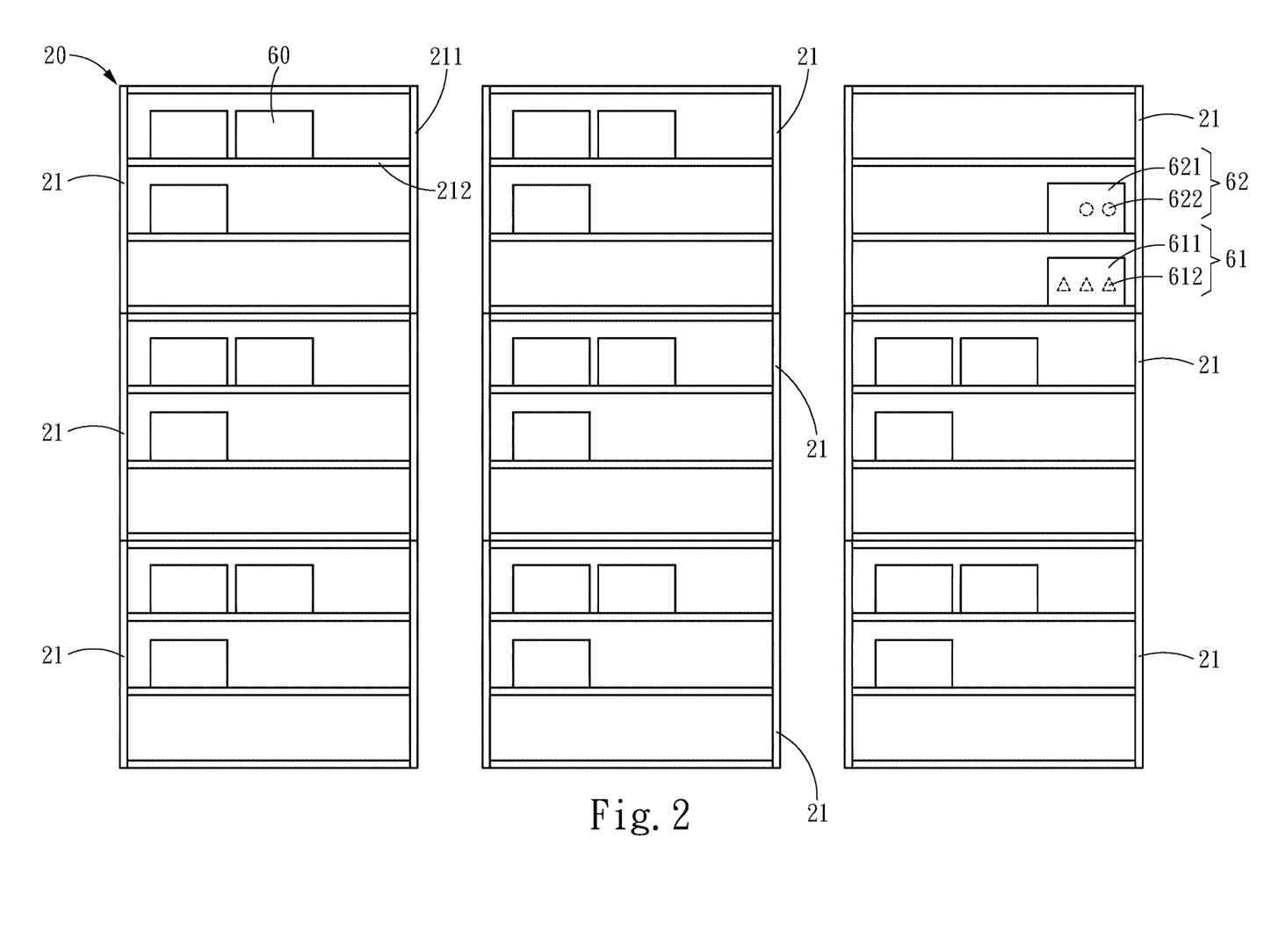
FIG. 2 is a schematic diagram of a storage rack array according to the present invention.

Referring to FIG. 1 and FIG. 2, FIG. 1 is the schematic diagram for configuration of the facility for executing the logistics operation according to the present invention. The present invention discloses a facility for executing a logistics operation, including: a warehouse facility 10, a storage rack array 20, a plurality of container reload stations 30, a plurality of first robot autonomous guided vehicles 41, a plurality of second robot autonomous guided vehicles 42, and a server 50. In the embodiment, the first robot autonomous guided vehicles 41 are used for moving commodities to be sorted, the second robot autonomous guided vehicles 42 are used for moving sorted commodities, and the commodities are sorted by means of the container reload station 30. Although the content below is described as including the storage rack array 20, the present invention is not limited thereto. In other embodiments, the facility may be operated without the storage rack array 20, i.e., cross docking is used. In the examples below, configuration of different warehouse facilities 10 are illustrated.

In different examples, the configuration patterns of the container reload stations 30 located in the warehouse facilities 10 may be selected differently. In some embodiments, the container reload stations 30, the first robot autonomous guided vehicles 41, and the second robot autonomous guided vehicles 42 at different times (jointly named as "a sorting and carrying module" below) of the single warehouse facility 10 may jointly execute different sorting modes (for example, execute a first sorting mode in a time period A, and execute a second sorting mode in a time period B) according to different order conditions. Furthermore, in some embodiments, a part of the sorting and carrying module in the single warehouse facility 10 may execute a certain sorting mode and yet another part thereof may execute another sorting mode at the same time (for example, some part of the sorting and carrying module executes the first sorting mode and some part of the sorting and carrying module executes the second sorting mode). In other words, the operation mode of the sorting and carrying module is dynamically adjusted based on different job objectives, and the optimum efficiency is achieved by combining different operation modes. In order to achieve the shortest time (or the most punctual time) required to fulfill orders or the optimum stacking efficiency (the lowest space occupation) of the inventory commodities or the above-mentioned combination, the server 50 may calculate the most proper sorting mode according to factors and/or limitations of the dynamic plurality of orders, corresponding commodity characteristics, the commodity stacking stability, the stowing efficiency of the carriers, and the delivery timeliness of the order commodities.

The warehouse facility 10 includes a level F and a plurality of areas defined on the level F. the areas include a sorting zone 11, a shipping zone 12, a storage zone 13, and a container storage zone 14. The shipping zone 12, the storage zone 13, and the container storage zone 14 are respectively in communication with the sorting zone 11. The storage rack array 20 is arranged in the storage zone 13, a plurality of inventory containers 60 are placed in the storage rack array 20, and the inventory containers 60 may be pallets, plastic containers, cartons, storage cases, storage boxes, or containers in other forms. For example, each of the inventory containers 60 contains a collection of same unsorted items. A plurality of order containers 70 (also referred to as order boxes) are placed in the container storage zone 14, the order containers 70 are configured to load products ordered by customers, and the order containers 70 may be in form of feed boxes, shipping cartons, storage racks, and the like. In an example, the single order container 70 would be bound to an order, and the order container 70 is used for loading the commodities of the order. For example, each of the order containers 70 contains a collection of heterogeneous sorted items.

Also referring to FIG. 2, FIG. 2 is a schematic diagram of the storage rack array in an embodiment of the present invention. The storage rack array 20 is fixedly arranged in the storage zone 13, and the storage rack array 20 includes a plurality of multi-layered storage racks 21. In an example, the plurality of multi-layered storage racks 21 may be stacked and parallelly arranged in the storage zone 13. Each of the multi-layered storage racks 21 includes a rack body 211 and a plurality of laminates 212 arranged on the rack body 211. The laminates 212 are used for carrying the plurality of inventory containers 60.

The inventory containers 60 are used for placing the plurality of commodities. It is to be understood that there are various types of commodities. The commodities placed in the single inventory container 60 are usually the same and the commodities placed in the different inventory containers 60 may be same or different dependent on the commodity quantity and the storage space. In the embodiments below, based on an objective for convenience of description, the inventory container 60 is defined to at least include a first inventory container 61 and a second inventory container 62. The first inventory container 61 includes a first container 611 and at least a first commodity 612. The first commodity 612 is placed in the first container 611. The second inventory container 62 includes a second container 621 and at least a second commodity 622. The second commodity 622 is placed in the second container 621. It is to be understood that the first container 611 and the second container 621 may have a different or same cargo load or carrying capacity.

In an example, each of the multi-layered storage racks 21 may include an automatic mechanical structure (not shown in drawings), and the automatic mechanical structure is used for transferring the inventory container 60 to one of the first robot autonomous guided vehicles 41. Alternatively, each of the first robot autonomous guided vehicles 41 may include an automatic mechanical structure (not shown in the drawings), and the automatic mechanical structure may obtain the inventory container 60 from the multi-layered storage rack 21.

The container reload stations 30 are fixedly arranged at the plurality of set points of the sorting zone 11 in advance, and the container reload station 30 includes a plurality of first placing points 31, a second placing point 32, and a sorting robot 33. The first placing points 31 and the second placing point 32 are located at a periphery of the sorting robot 33. The sorting robot 33, for example, may be realized by an automatic robotic arm. But the creation is not limited thereto. The sorting robot 33 may be realized with any possible mechanical structure, and the container reload stations 30 are communicatively connected to the server 50.

The first robot autonomous guided vehicles 41 are configured between the sorting zone 11 and the storage zone 13 to respectively transfer the inventory containers 60 to the container reload station 30 for sorting operation. The second robot autonomous guided vehicles 42 are configured among the sorting zone 11, the shipping zone 12, and the container storage zone 14 to respectively transfer the order containers 70 to be loaded to the container reload station 30 for sorting operation, and to transfer the loaded order containers 70 to the shipping zone 12. The first robot autonomous guided vehicles 41 and the second robot autonomous guided vehicles 42, for example, may be realized by Automation Guided Vehicles (AGV).

The server 50 is communicatively connected to the sorting robot 33, the first robot autonomous guided vehicles 41 and the second robot autonomous guided vehicles 42, and the server 50 includes a calculation unit 51, a sending unit 52, and a storage unit 53.

From a top view, the storage zone 13 is located above the sorting zone 11, and the shipping zone 12 and the container storage zone 14 are respectively arranged on two sides of the sorting zone 11. Further, the container reload stations 30 are oppositely arranged in the sorting zone 11 and a traffic line 15 is arranged among the plurality of container reload stations 30, such that the first robot autonomous guided vehicles 41 and the second robot autonomous guided vehicles 42 can pass through.

Figure 3:
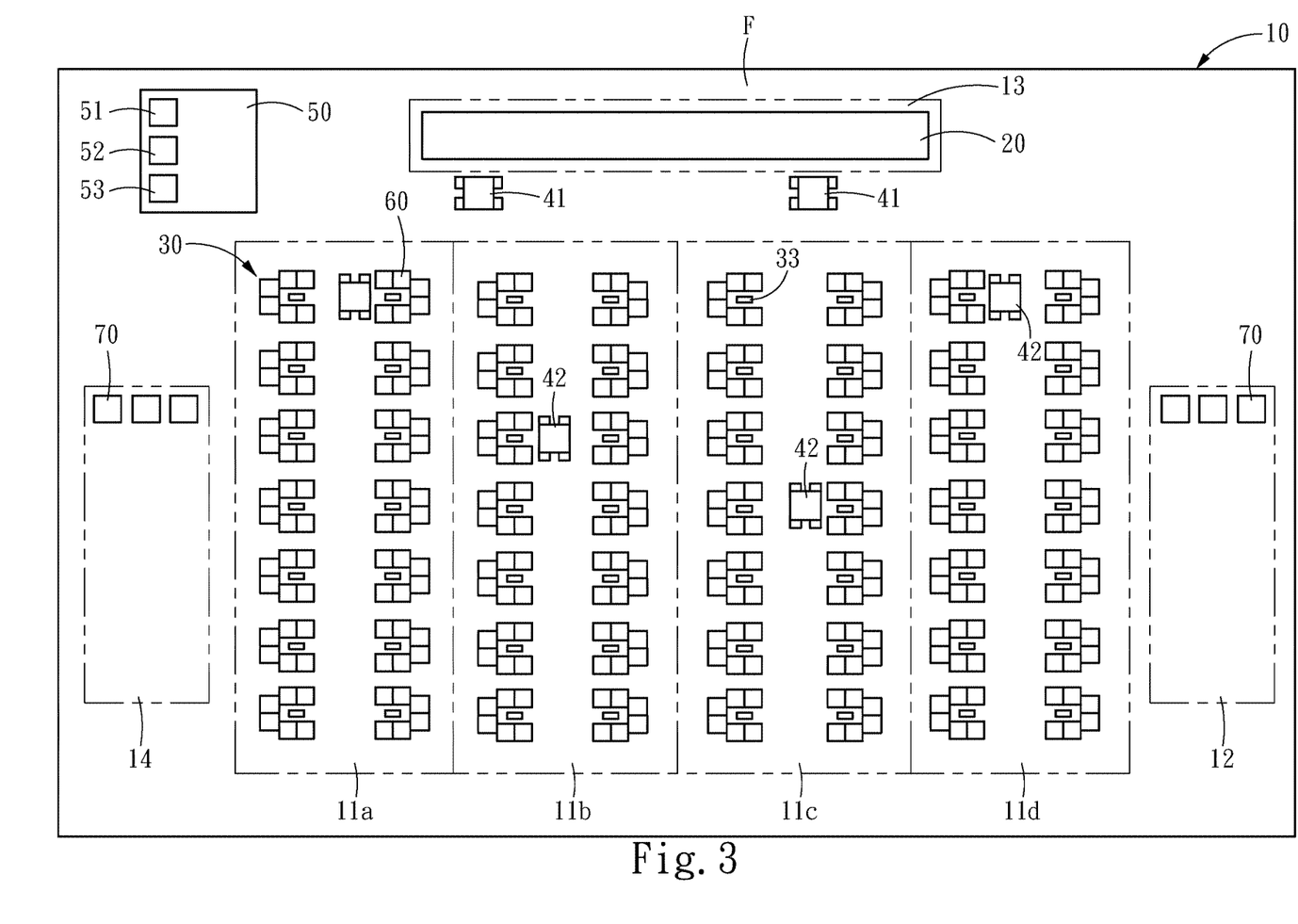
FIG. 3 to FIG. 5 are schematic diagrams for configuration of a facility for executing a logistics operation in different examples according to the present invention.

Referring to FIG. 3, in an example of the embodiment, the sorting zone 11 includes a plurality of strip-like sorting zones 11a, 11b, 11c, and 11d, which respectively extend from the end close to the storage zone 13 to the end away from the storage zone 13. These sorting zones 11a, 11b, 11c, and 11d are arranged parallelly. In the embodiment, compared with FIG. 1, the sorting zone 11 is further segmented into a plurality of sub areas, and channels where the autonomous carries move are reserved in and among the sub areas. Accordingly, different sorting modes may be simultaneously executed in the sorting zones 11a, 11b, 11c, and 11d (sub areas) respectively and independently. By combining the different sorting modes, the optimum utilization efficiency is achieved. Specific operating details about the sorting modes will be described in detail below.

Figure 4:
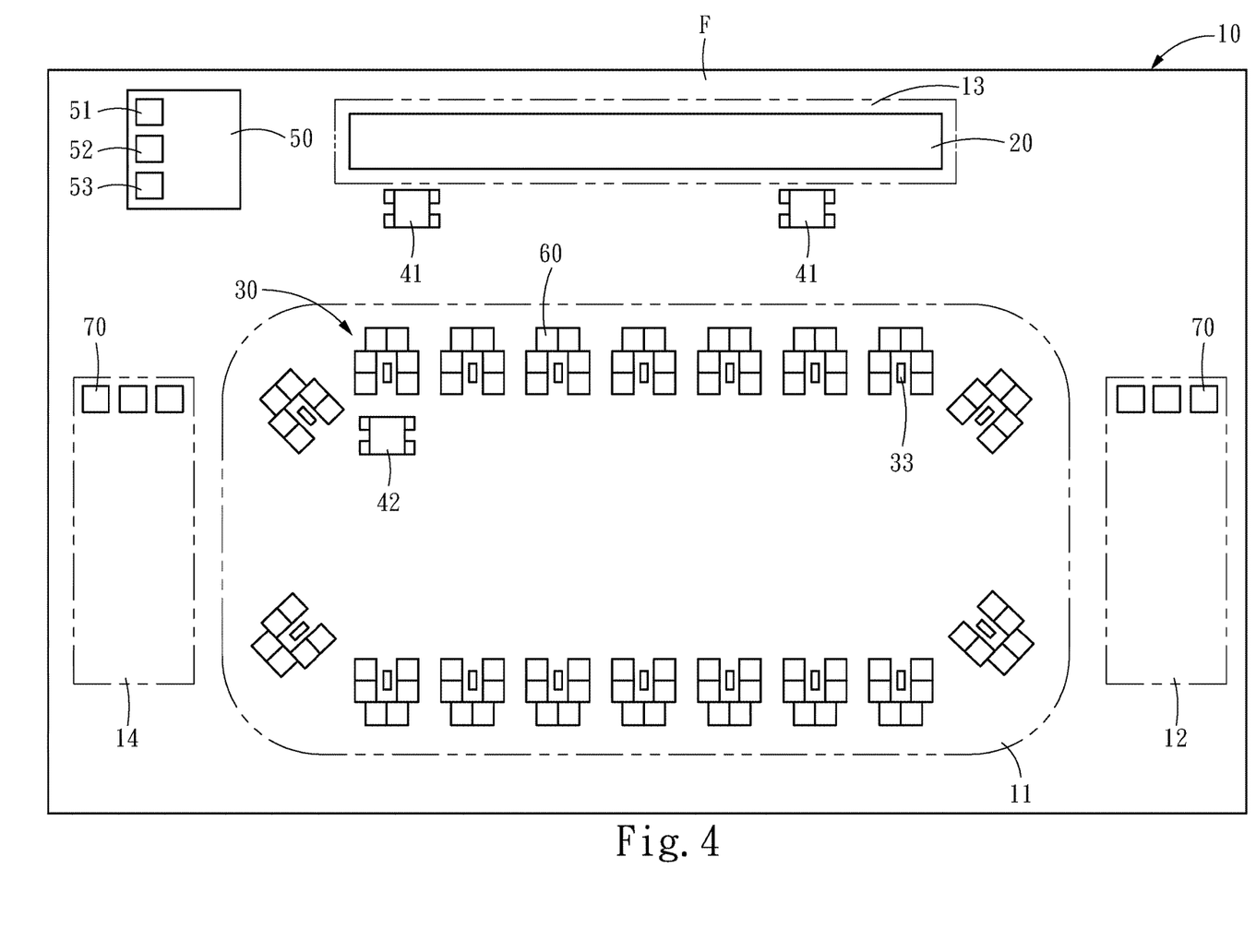

Referring to FIG. 4, in another example of the embodiment, the sorting zone 11 is configured to be a circular area. Accordingly, the container reload stations 30 are circularly arranged in the sorting zone 11.

Figure 5:
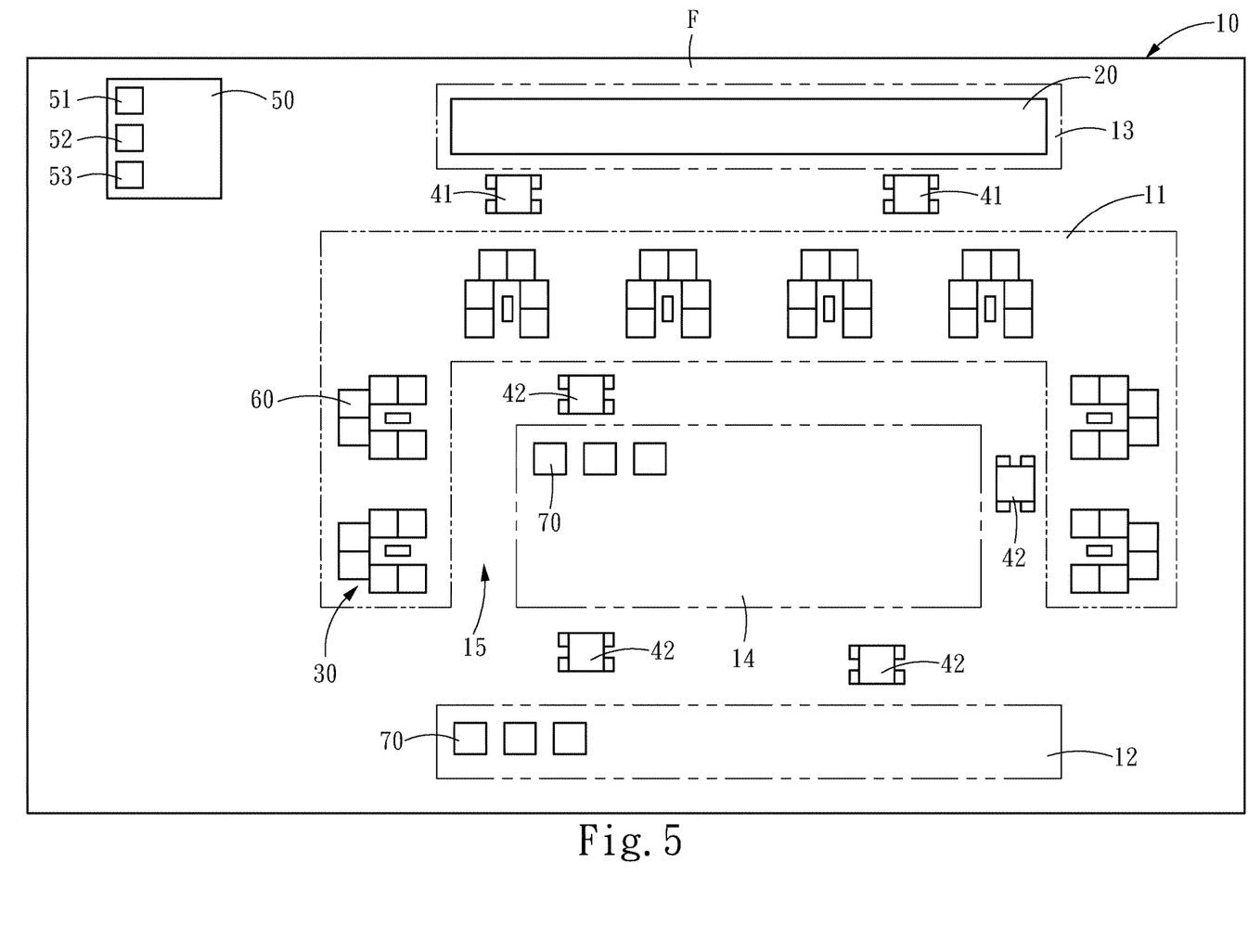

Referring to FIG. 5, in yet another example of the embodiment, the sorting zone 11 forms a U-shape-like configuration along a central area of the level F. The sorting zone 11 includes a first portion, a second portion, and a third portion. The first portion is close to the storage zone 13, and the second portion and the third portion are configured in such a manner that they respectively extend from two ends of the first portion towards the direction away from the storage zone 13. The center area may be configured to be the container storage zone 14. The traffic line 15 is arranged between the sorting zone 11 and the container storage zone 14, such that the first robot autonomous guided vehicles 41 and the second robot autonomous guided vehicles 42 can pass through. The storage zone 13 is configured at a periphery of a part of the sorting zone 11 along the level F, and the shipping zone 12 is located at a periphery of the sorting zone 11 and is away from one side of the storage zone 13.

The above-described configuration of the facility is used for selecting one of the plurality of sorting modes dynamically to achieve the optimum efficiency according to the contents of the plurality of orders received within a period of time. Furthermore, alternatively, in a case where the configuration of the facility permits, two or more sorting modes may be executed at the same time in the single facility, and operation of the facility achieves the optimum efficiency. For an example in FIG. 3, the first sorting mode may be executed in the sorting zones 11a and 11c, and the second sorting mode may be executed in the sorting zones 11b and 11d.

Figure 6:
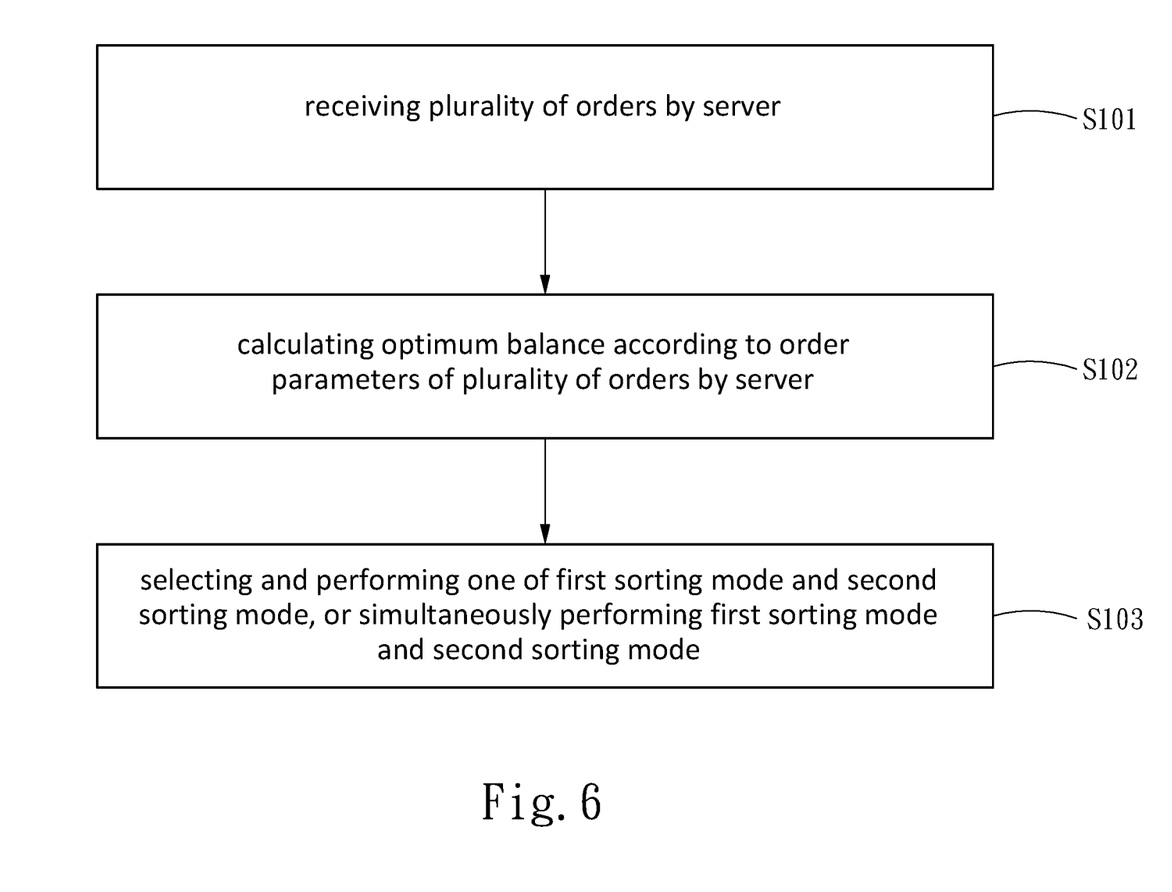
FIG. 6 is a schematic flowchart of a step for executing a logistics operation in a first embodiment of the present invention.

The above-mentioned facility may be a logistics warehousing system provided by the suppliers, the commodity providers, or the logistics service providers in the supply chains for transportation and storage of cargo. The present invention executes the operations described below based on the above illustrated facility. Referring to FIG. 6, FIG. 6 is the schematic flowchart of the step for executing the logistics operation in the first embodiment of the present invention. The method shown in FIG. 6 may be executed based on the facility in any aforementioned example.

Firstly, the server 50 receives an plurality of orders (step S101). The plurality of orders are, for example, a stack of orders within a period of time. Information of the plurality of orders may be stored in the storage unit 53. The plurality of orders respectively includes a plurality of order parameters. Furthermore, the orders may include various information, for example, information of orders. The order parameters include any one of a product type, a product size, and product quantity or a combination thereof. The example is illustrated in a case where the facility is used for processing the orders of product ordering. It is to be understood that in a case where the logistics warehousing system which does not execute the orders of product ordering, the plurality of orders may be replaced by other proper information, for example, shipping instructions or delivering instructions.

The server 50 calculates an optimum balance (step S102) according to the order parameters of the plurality of orders, so as to select one of a plurality of sorting modes. The optimum balance is a combination of the shortest distances that the first robot autonomous guided vehicles 41 and the second robot autonomous guided vehicles 42 are required to move to fulfill the orders (or the instructions) and the shortest number of times required to operate the sorting robot 33 calculated by the calculation unit 51 of the server 50 according to the order parameters. The calculation unit 51 generates a plurality of instructions according to a result of the optimum balance, and the sending unit 52 sends the instructions to the sorting robot 33, the first robot autonomous guided vehicles 41, and the second robot autonomous guided vehicles 42 to instruct the sorting robot, the first robot autonomous guided vehicles, and the second robot autonomous guided vehicles to perform corresponding sorting modes. The optimum balance is obtained by means of optimum calculation.

In an example, the sorting modes may include at least one of a first sorting mode and a second sorting mode.

In the first sorting mode, the first robot autonomous guided vehicles 41 first transfer the inventory containers 60 to the plurality of first placing points 31 of the container reload station 30 and then the second robot autonomous guided vehicles 42 transfer the order containers 70 to be loaded to the second placing points 32 of the container reload station 30, and the sorting robot 33 moves commodities in the inventory containers 60 to the order containers 70 according to the orders. For example, in a case where there are many types of commodities in the plurality of orders and the commodity quantity of the single type is small, or one of the orders includes different commodities (i.e., there are many types of commodities in the single order) in the plurality of inventory containers 60, the first sorting mode is preferred. The many types of commodities are first placed at the plurality of first placing points 31 at the periphery of the sorting robot 33, such that the sorting robot 33 transfers the many types of commodities to one order container 70 according to the order.

In the second sorting mode, the second robot autonomous guided vehicles 42 first transfer the order containers 70 to be loaded to the first placing points 31 of the container reload station 30 and then the first robot autonomous guided vehicles 41 transfer the inventory containers 60 to the second placing point 32 of the container reload station 30, and the sorting robot 33 moves the commodities in the inventory containers 60 to the order containers 70 according to the orders. For example, in a case where there are fewer types of commodities in the plurality of orders and the commodity quantity of the single type is great, or the plurality of the orders include same commodities (i.e., the quantity of same commodities in the single order is great) in the inventory containers 60, the second sorting mode is preferred. The plurality of order containers 70 are first placed at the plurality of first placing points 31 at the periphery of the sorting robot 33, such that the sorting robot 33 transfers the fewer or the single type of stack of commodities to the plurality of order containers 70 according to the orders.

After the sorting robot 33, the first robot autonomous guided vehicles 41, and the second robot autonomous guided vehicles 42 receive the instructions, one of the first sorting mode and the second sorting mode is selected, alternatively, a part of the sorting robot 33, the first robot autonomous guided vehicles 41, and the second robot autonomous guided vehicles 42 perform the first sorting mode, and the other part of the sorting robot 33, the first robot autonomous guided vehicles 41, and the second robot autonomous guided vehicles 42 perform the second sorting mode (simultaneously perform) (step S103).

Figure 7:
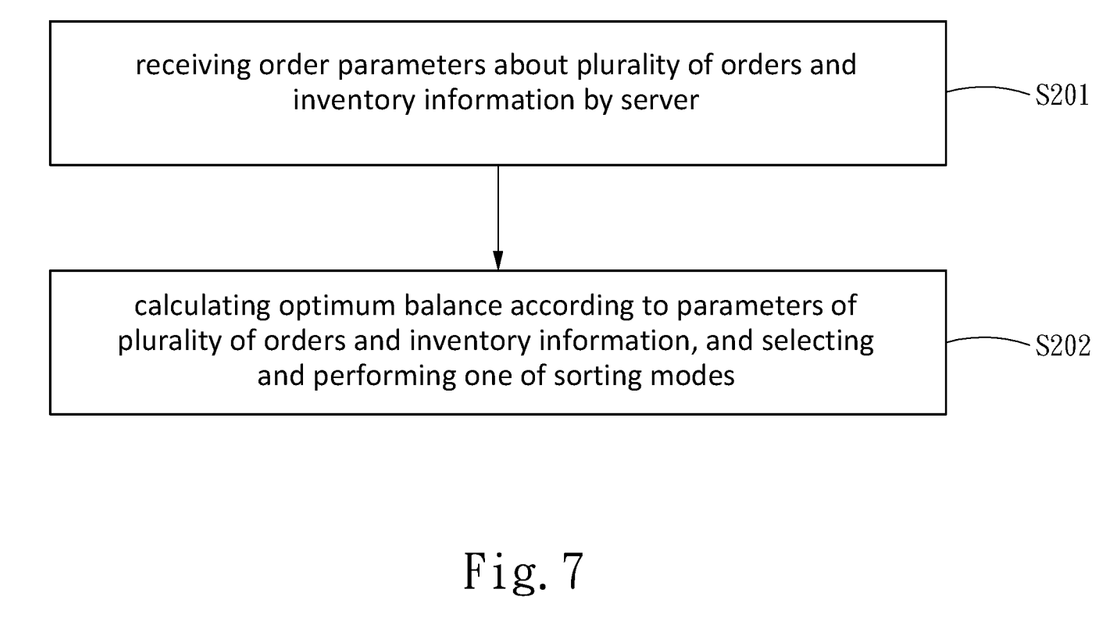
FIG. 7 is a schematic flowchart of a step for executing a logistics operation in a second embodiment of the present invention.

Referring to FIG. 7, FIG. 7 is a flowchart for executing the logistics operation in the second embodiment of the present invention. The method shown in FIG. 7 may be executed based on the facility in any aforementioned example. The method includes the following steps:

The server 50 receives parameters about the plurality of orders and the inventory information (step S201).

The server 50 calculates an optimum balance according to the parameters of the plurality of orders and the inventory information so as to select one of the plurality of sorting modes (step S202). In an example, the sorting modes may include at least two of the first sorting mode, the second sorting mode, and a third sorting mode.

In the third sorting mode, the first robot autonomous guided vehicles 41 transfer the first inventory containers 61 to the first placing points 31 of the container reload station 30, the second robot autonomous guided vehicles 42 transfers the second inventory containers 62 to the second placing points 32 of the container reload station 30, and the sorting robot 33 carries and exchanges the commodities in the first inventory containers 61 and the commodities in the second inventory containers 62. It is to be understood that when the third sorting mode is used, a part of the first placing points 31 may serve as the second placing points 32, i.e., there are a plurality of the first placing points 31 and the second placing points 32. In actual application, the third sorting mode is as follows: some commodities are converted from containers of one specification to containers of another specification as required. For example, for the demand of subsequent transportation, some commodities are converted from a large-sized pallet to a small-sized pallet.

Figure 8:
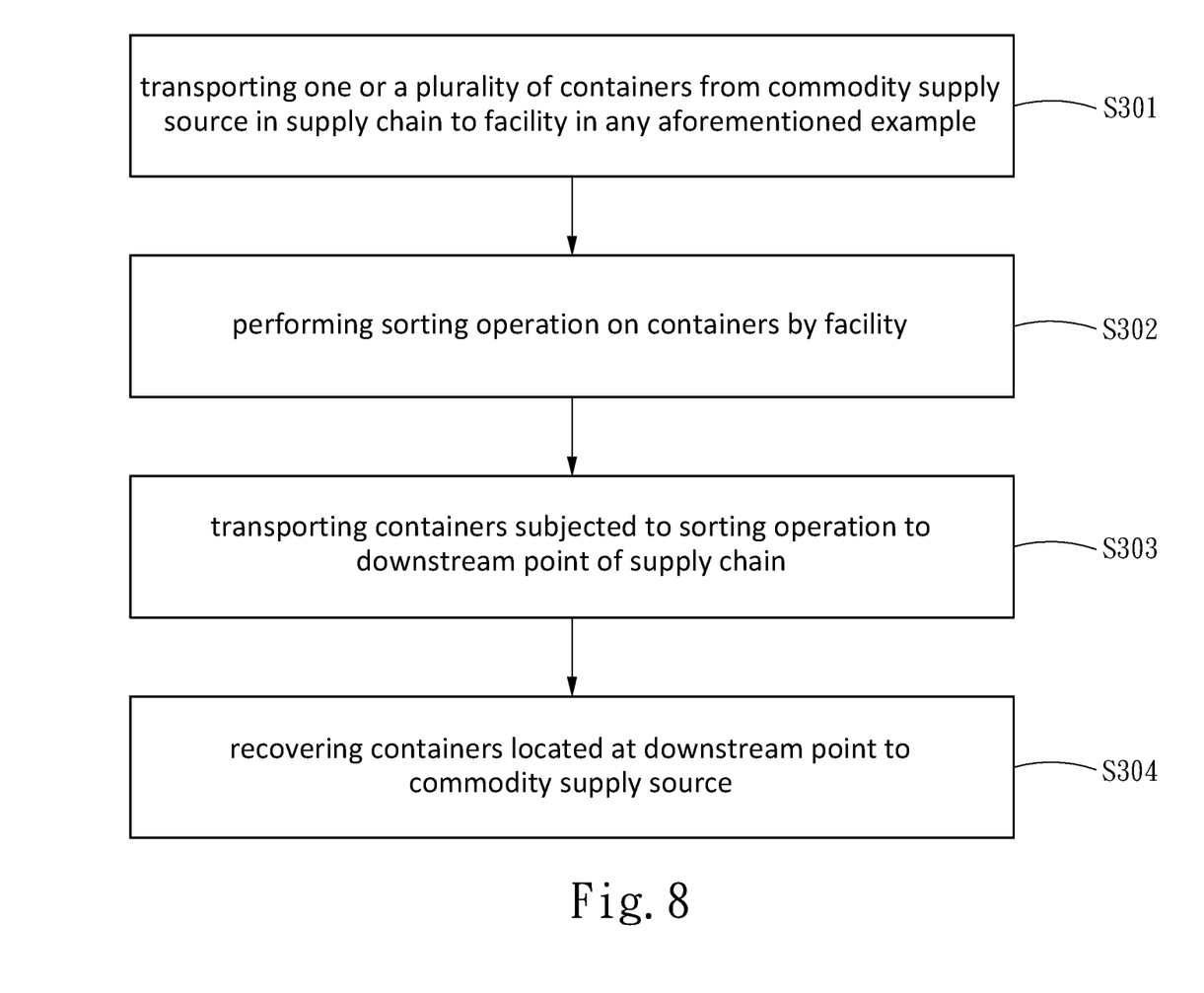
FIG. 8 is a schematic flowchart of a step for executing a logistics operation in a third embodiment of the present invention.

Referring to FIG. 8, FIG. 8 is the schematic flowchart of the step for executing the logistics operation in the third embodiment of the present invention. The method shown in FIG. 8 may be executed based on the facility in any aforementioned example. The method includes the following steps:

S301: transporting one or a plurality of containers from a commodity supply source in a supply chain to the facility in any aforementioned example;

S302: the facility performing a sorting operation on the containers;

S303: transporting the containers subjected to the sorting operation to a downstream point of the supply chain, wherein the downstream point may be another abovementioned facility, a store owner, or a terminal customer. In other words, the sorting operation may be performed on the supply chain by means of a plurality of facilities. The server 50 of each of the facilities may be connected to a central computer. The central computer may be used for calculating an optimum sorting mode, wherein the plurality of plurality of orders are divided into a plurality of groups which are then assigned to the most suitable facilities to perform sorting in the optimum sorting mode; further, except for the unmanned carriers (i.e., the first robot autonomous guided vehicles 41 and the second robot autonomous guided vehicles 42) combined with mechanical arms (i.e., the sorting robots 33) in the facility, transportation at stations from an upstream point to a downstream point of the supply chain may further be performed by self-driven trucks or self-driven wagons, thereby forming a completely unmanned supply chain;

S304: finally, recovering the containers located at the downstream point to the commodity supply source. Whereby, the containers may be recycled to achieve an environmentally sustainable objective.

Figure 9:
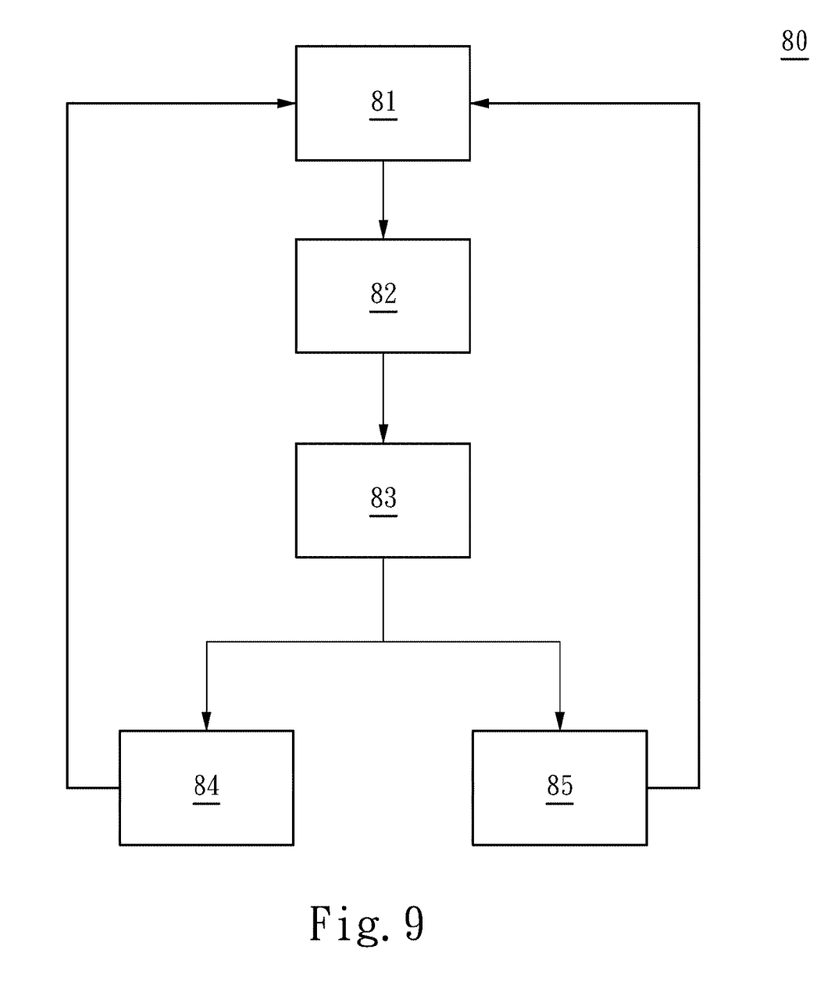
FIG. 9 is a schematic diagram for executing a logistics operation in an embodiment of the present invention.

Also referring to FIG. 9, FIG. 9 shows a supply chain 80. The supply chain 80 includes a commodity supply source 81, an automatic warehousing facility 82, a sorting facility 83, a store owner 84, and a terminal client 85. The commodity supply source 81 may be a production plant or a supplier. The automatic warehousing facility 82 may be integrated into the sorting facility 83, or as shown in FIG. 9, the automatic warehousing facility is separated independent hardware, or perhaps, the automatic warehousing facility 82 may be omitted in the supply chain 80. It is illustrated below in the presence of the automatic warehousing facility 82.

In a case where the commodity supply source 81 is to transport commodities to the downstream point, the containers will be transported to the automatic warehousing facility 82 for a temporary storage objective. Then, the containers loading the commodities would be then delivered to the sorting facility 83, and the sorting facility 83 as mentioned earlier further selectively delivers the containers subjected to the sorting operation to the store owner 84 or the terminal client 85.

In an example, in a case where the commodities are transported by means of the containers according to a plurality of orders in a same distribution area and the containers are transported to the sorting facility 83 (or the store owner 84 or the terminal client 85) in a target area, after being sorted, the containers may be transported back to the original storage point so as to be recycled. Further, circulation of the containers refers to that a computer system manages reserve and supply at each node.

In conclusion, the facility disclosed by the present invention may dynamically switch different sorting modes according to demands and is not constrained to a specific carrying flow. For satisfying the order request, the most effective sorting mode and flow may be provided dependent on properties of a stack of orders. In addition, the sorting mode (the above-mentioned third sorting mode) where containers of different specifications are exchanged may further be added, accordingly satisfying the shipping demand. The largest degree of flexibility and efficiency of firmware application are achieved by means of rotation of the various sorting modes.

What is claimed is:

1. A facility for executing a logistics operation, comprising:
   a warehouse facility, comprising a level and a plurality of areas defined on the level, the area comprising a sorting zone and a shipping zone connecting with the sorting zone;
   a plurality of container reload stations, fixedly arranged at a plurality of predetermined locations in the sorting zone, each of the plurality of container reload stations comprising a sorting robot, a plurality of first placing points and a second placing point, wherein the first placing points and the second placing point arrayed peripherally around the sorting robot, wherein the sorting robot comprises a robotic arm configured to move commodities in an inventory container to an order container or another inventory container, wherein each inventory container is configured to store at least one of the commodities, and the order container is configured to load at least one of the commodities ordered by a customer;
   a plurality of first robot autonomous guided vehicles, each comprising an automatic mechanical structure, and configured to transfer the inventory container to the container reload station;
   a plurality of second robot autonomous guided vehicles, each comprising an automatic mechanical structure, and configured to transfer the order container to be loaded to the container reload station; and
   a server, communicatively connected to the sorting robot, the first robot autonomous guided vehicles, and the second robot autonomous guided vehicles through a wireless or wired network, and the server configured to send a plurality of instructions to the sorting robot, the first robot autonomous guided vehicles, and the second robot autonomous guided vehicles,
   wherein the server is configured to execute the following steps:
      receiving a plurality of orders by the server, wherein the order respectively comprises a plurality of order parameters;
      calculating, by the server, an optimum balance between the shortest distances that the first robot autonomous guided vehicles and the second robot autonomous guided vehicles are required to move to fulfill the orders and the shortest number of times required to operate the sorting robot according to the order parameters of the plurality of orders, so as to select one of a plurality of sorting modes;
      generating, by the server, the plurality of instructions based on the selected sorting mode; and
      sending, by the server, the plurality of instructions to the sorting robot, the first robot autonomous guided vehicles, and the second robot autonomous guided vehicles to perform the selected sorting mode,
   wherein the sorting robot, the first robot autonomous guided vehicles, and the second robot autonomous guided vehicles are controlled by the server based on the selected sorting mode.

2. The facility according to claim 1, wherein the warehouse facility further comprises a storage zone connecting with the sorting zone, the storage zone is provided with a storage rack array, and the inventory container is placed in the storage rack array.

3. The facility according to claim 1, wherein the warehouse facility further comprises a container storage zone connecting with the sorting zone, and the container storage zone is configured to place the order container.

4. The facility according to claim 1, wherein the server comprises a calculation unit, a storage unit, and a sending unit, the storage unit stores the plurality of orders, the calculation unit performs calculation on the plurality of order parameters to obtain the optimum balance, and the sending unit controls the sorting robot, the first robot autonomous guided vehicles, and the second robot autonomous guided vehicles to execute the one of the plurality of sorting modes according to the optimum balance.

5. The facility according to claim 1, wherein the plurality of order parameters comprise any one of a product type, a product size, and product quantity or a combination thereof.

6. The facility according to claim 1, wherein the sorting modes comprise:
   a first sorting mode, wherein the first sorting mode is as follows: the first robot autonomous guided vehicles first transfer the inventory container to the first placing point of the container reload station and then the second robot autonomous guided vehicles transfer the order container to be loaded to the second placing point of the container reload station, and the sorting robot moves commodities in the inventory container to the order container according to the orders; and
   a second sorting mode, wherein the second sorting mode is as follows: the second robot autonomous guided vehicles first transfer the order container to be loaded to the first placing point of the container reload station and then the first robot autonomous guided vehicles transfer the inventory container to the second placing point of the container reload station, and the sorting robot moves the commodities in the inventory container to the order container according to the plurality of orders.

7. The facility according to claim 6, wherein the warehouse facility further comprises a storage zone connecting with the sorting zone, the storage zone is provided with a storage rack array, and the inventory container is placed in the storage rack array.

8. The facility according to claim 6, wherein the warehouse facility further comprises a container storage zone connecting with the sorting zone, and the container storage zone is configured to place the order container.

9. The facility according to claim 6, wherein the server comprises a calculation unit, a storage unit, and a sending unit, the storage unit is used for storing the plurality of orders, the calculation unit performs calculation on the plurality of order parameters to obtain the optimum balance, and the sending unit controls the sorting robot, the first robot autonomous guided vehicles, and the second robot autonomous guided vehicles to execute the sorting mode according to the optimum balance.

10. The facility according to claim 6, wherein the order parameter comprises any one of a product type, a product size, and product quantity or a combination thereof.

11. The facility according to claim 6, wherein the sorting modes further comprise: a third sorting mode, wherein the first robot autonomous guided vehicles transfer a first inventory container to the first placing point of the container reload station, the second robot autonomous guided vehicles transfer a second inventory container to the second placing point of the container reload station, and the sorting robot exchanges commodities in the first inventory container and commodities in the second inventory container.

12. The facility according to claim 11, wherein the warehouse facility comprises a storage zone connecting with the sorting zone, the storage zone is provided with a storage rack array, and a plurality of first inventory containers and a plurality of second inventory containers are placed in the storage rack array.

13. The facility according to claim 1, wherein the logistics operation comprises the following steps:
- transporting one or a plurality of containers from a commodity supply source in a supply chain to the facility;
- performing a sorting operation on the plurality of containers by the facility; and
- transporting the plurality of containers subjected to the sorting operation to a downstream point of the supply chain.

* * * * *